(12) United States Patent
Tsappi

(10) Patent No.: US 6,302,368 B1
(45) Date of Patent: *Oct. 16, 2001

(54) DEVICE FOR RETAINING SUPPORTS FOR PLANTS IN A CONTAINER

(76) Inventor: Philip Tsappi, 24 Alder Grove, Cricklewood, London (GB), NW2 7DB ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/436,394

(22) Filed: Nov. 8, 1999

(30) Foreign Application Priority Data

Nov. 19, 1998 (GB) .................................................. 9825223
Mar. 26, 1999 (GB) .................................................. 9906938

(51) Int. Cl.[7] ...................................................... F16M 13/00
(52) U.S. Cl. ............................ 248/523; 248/314; 47/44; 47/47

(58) Field of Search .................................. 248/314, 213.2, 248/523, 534; 47/44, 47, 46, 42, 43, 70

(56) References Cited

U.S. PATENT DOCUMENTS

| 3,582,028 | * | 6/1971 | Purdy | 47/40.5 |
| 3,778,929 | * | 12/1973 | Pearson | 47/58.1 |
| 4,074,461 | * | 2/1978 | Hirschman | 47/70 |
| 4,320,886 | * | 3/1982 | Stodola | 248/523 |

FOREIGN PATENT DOCUMENTS 2 220 118 A * 1/1990 (GB).
2307170 A * 5/1997 (GB).

* cited by examiner

Primary Examiner—Anita King
Assistant Examiner—Holly N. Sy

(57) ABSTRACT

A device for retaining different types of plant supports comprises a frame consisting of four members with ends that are releasably inserted into bores of a collar having a central passage and ends that are inserted into holes in container. The central passage on the collar receives the plant support.

10 Claims, 5 Drawing Sheets

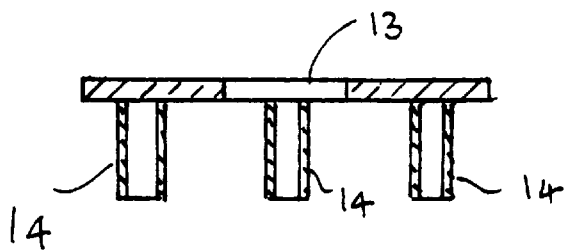
FIG. 5
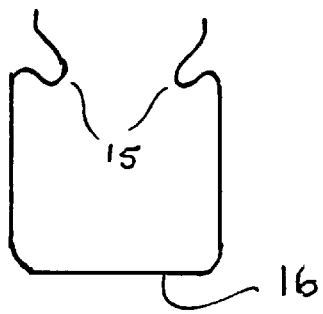
FIG. 6
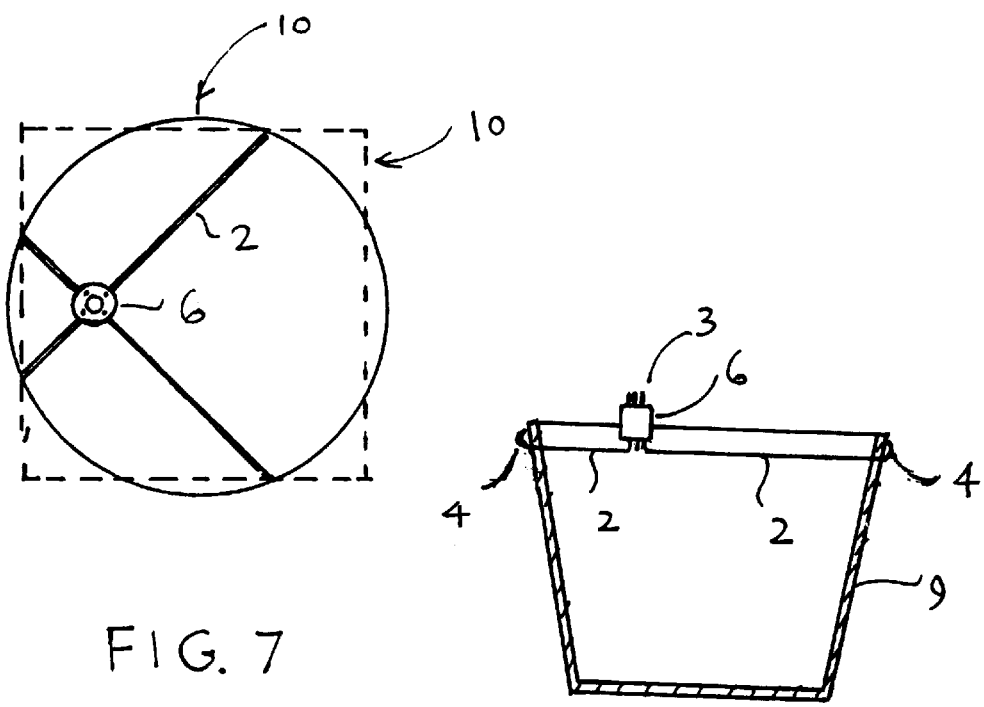
FIG. 7
FIG. 9

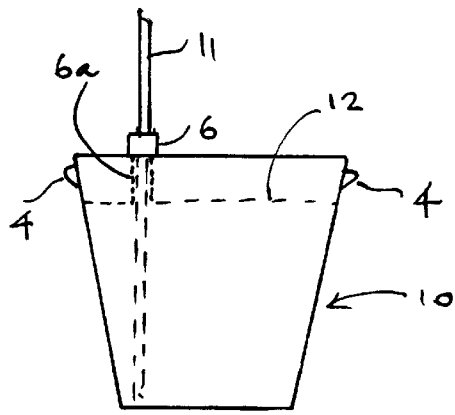
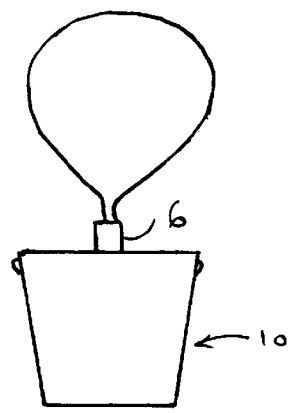
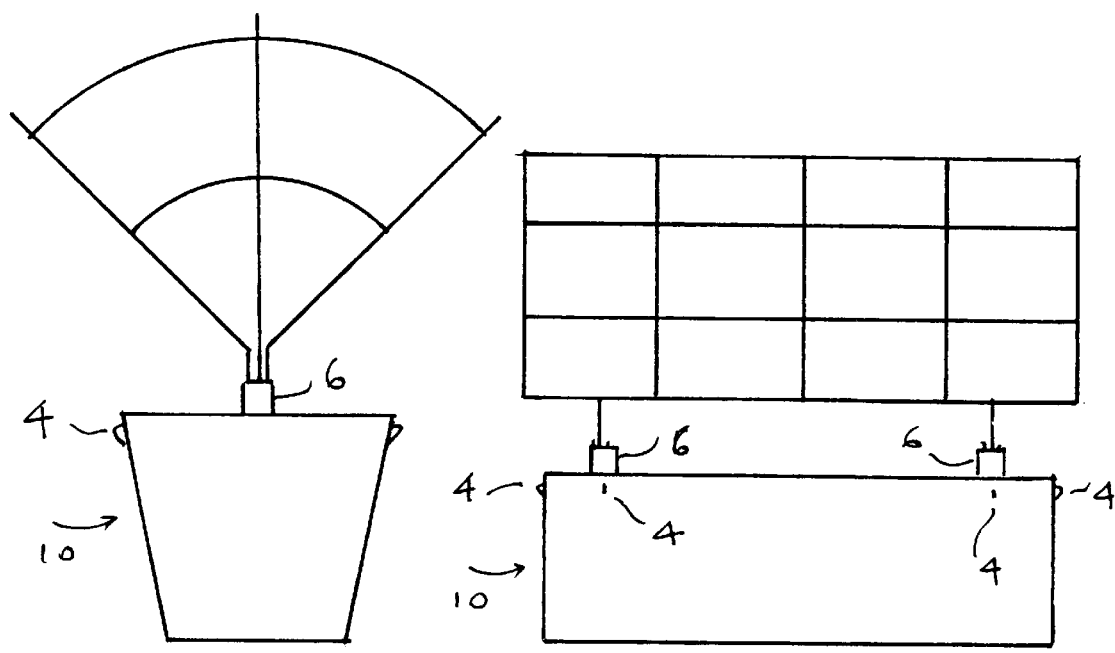
FIG. 8a  FIG. 8b  FIG. 8c  FIG. 8d.
FIG. 8

DEVICE FOR RETAINING SUPPORTS FOR PLANTS IN A CONTAINER

BACKGROUND OF THE INVENTION

This invention relates in general to retainers for plant support and in particular supports used to prop up a plant in a container such as a pot, a bucket or a planter.

The problem of supporting canes and stakes within pots has long been recognised and a number of solutions have been proposed. The problem manifests itself more in the case when fruit bearing plants such as tomato need to be supported.

In some instances as for example when the pot is small, canes are too large and sticks are used or a plastic fan shape mesh is inserted directly into the growing medium resulting in inadequate support.

In the case of a bushy plant such as fuschia, a number of stems have to be supported and therefore a single cane is inappropriate.

For climbing plants, a trellis like construction, a hoop or a mesh is more appropriate.

It has been proposed previously to provide a device for supporting a plant comprising a collar having two elements releasably secured together, the collar being supported above the lowest most end of the legs with the legs being inserted in recesses formed on the perimeter of a container. Such support device is disclosed in GB 2307170A.

It has been found that when such supporting device whilst operating satisfactorily in supporting plant stems when a cane or stake is supported on which an appreciable bending moment is exerted together with movement due to wind, the two halves of the collar may come apart.

Furthermore, the container for use with the disclosed device needs to be specially manufactured to include on its upper perimeter housing in which the lower part of the legs fit tightly.

The object of the present invention is therefore to overcome the above limitations and provide a cost effective and simple device which can be used to retain a variety of plant supports, as required by the type of plant, with more than one size and shape of readily available containers.

SUMMARY OF THE INVENTION

According to the present invention there is provided a device for retaining supports for plants in a container comprising a frame consisting of a plurality of members with each member consisting of a substantially horizontal rod element, a downward or upward rod element making an angle of slightly less than 90° to the horizontal rod element, and an upstanding rod element making an angle of slightly greater than 90° to the horizontal rod element, and at least one collar defining a substantially vertical passage therethrough adapted to retain a plant support, the collar having vertical bores in a wall thereof adapted to releasably receive an upstanding rod element of each member and retain the vertical rod element of a plant support, the downward or upward element of each member is adapted to releasably engage a respective hole in a side wall of the container, the angles and the length of the horizontal element of each member being such that as the collar is pushed downwardly onto the upstanding rod elements the frame is pulled radially inwards and the downward rod elements bear tightly against the container wall, there being further means for reducing the radial dimension of the vertical passage and the vertical bores of the collar to retain smaller sizes of plant supports and smaller sizes of upstanding rod elements respectively.

The metal rods forming the frame could be galvanised and in addition covered in a plastic sheath or coating.

While more than four members might be provided to form the frame, four is the preferred number disposed around the perimeter of the container and preferably but not essentially at right angles to each other. The horizontal elements of the frame may have unequal lengths.

The collar supported by the frame is manufactured preferably from a plastic material although other materials can be used and conveniently has more bores than required by the upstanding elements. The collar can have any shape and slots can also be incorporated into the collar.

The bores can have any dimension shape and disposition relative to the centre of the collar. Preferably a rod with a circular cross section is used for the frames requiring four cylindrical bores equidistant from the centre. The remaining bores can be used to retain different types of plant supports.

Preferably the horizontal elements can be inserted into holes made on the upward wall of the container with the downward or upward elements pressing against the wall of the container. In this case the frame must first be fitted to the container and then the collar to the upstanding elements. If the cane is required to be contained within the collar and not pass through into the growing medium one or more spring clips can be fitted to the collar so as to block the central passage.

In use, rocking of the plant support must not dislodge the collar from the frame and the frame from the container. To achieve this the upstanding elements make a frictional fit within the bores and bent slightly more than 90°, the downward or upward elements are at an angle less than 90°0 and the length of the horizontal elements selected so that when the collar is pushed down to rest on the horizontal elements, the assembly is pulled tight within the container and the tips of the downward or upward elements bear tightly against the side of the container.

Instead of one thick collar two thinner collars can be used spaced about 30 mm apart.

The collar can be positioned some distance from the centre of the container by making one pair of the horizontal elements longer than the second pair. Since the upstanding elements if constructed from round rods are pivoted within the bores, the longer horizontal elements can be rotated so that a different shape and larger container can be used with the same device. For an oblong container a pair of devices may be necessary.

The central passage and bores are sized and shaped as required by the frame, container and plant supports. The same collar can be used with smaller size rods and stakes by altering the radial dimensions of the bores and passage. One way is to attach to a disc tubes which are inserted into the bore with a friction fit with the disc resting on the collar. If only the central passage is required to be reduced, then a length of suitably sized tubing can be inserted within the collar.

BRIEF DESCRIPTION OF THE DRAWINGS

In order that the invention may be more readily understood embodiments of the invention will now be described by way of example, with reference to the accompanying drawings in which:

FIG. 5 is an attachment for reducing the dimension of the central passage and bores.

FIG. 6 is one form of a clip used to block one end of the passage.

FIG. 7 shows the same device used for a round or a square container.

FIG. 8 shows the device as used in retaining different types of plant supports.

FIG. 9 is a view of an alternative embodiment of the device of the present invention.

DETAILED DESCRIPTION OF THE INVENTION

Figure 1:
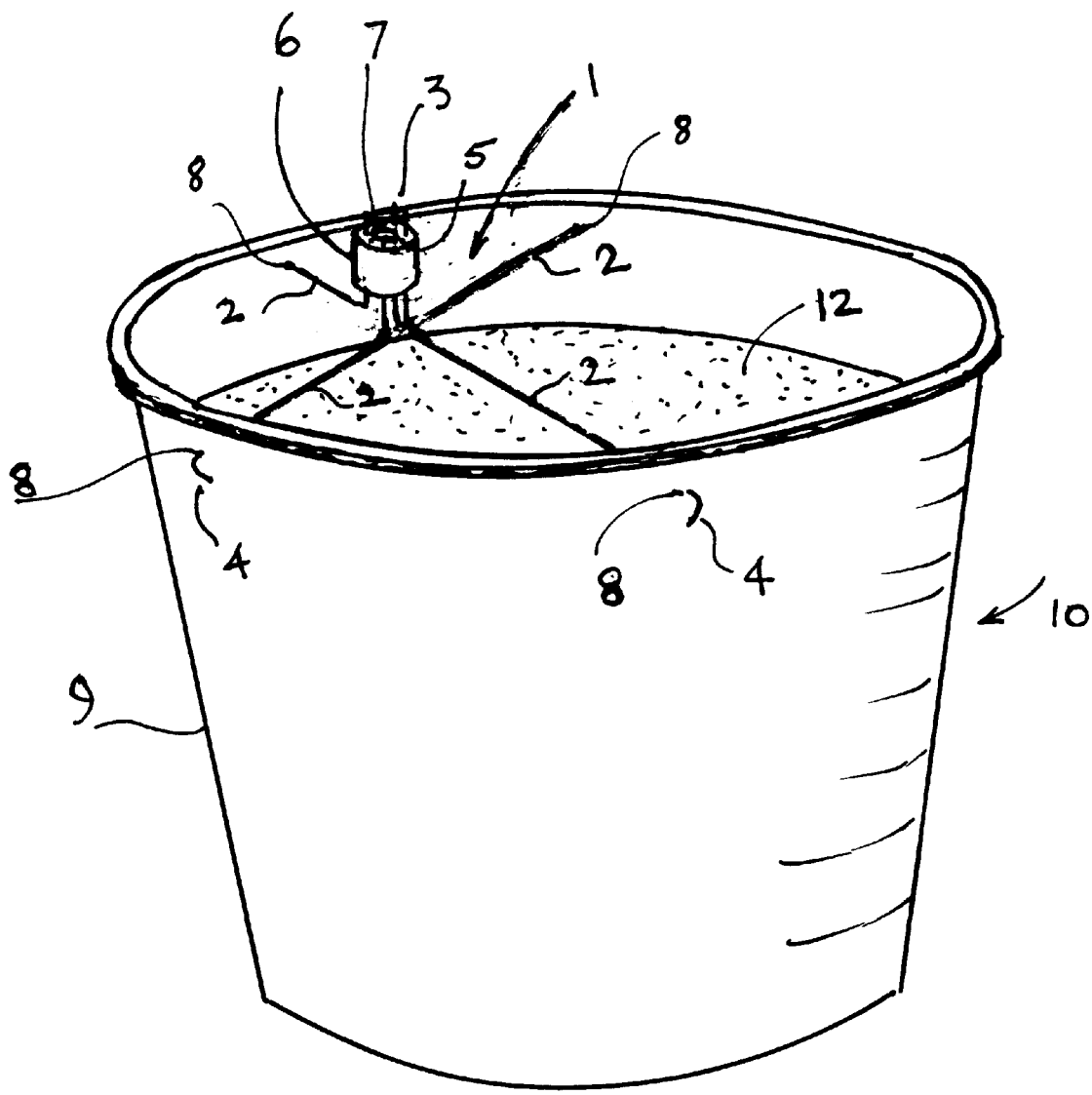
FIG. 1 is a perspective view of the device fitted to a round container.
Figure 2:
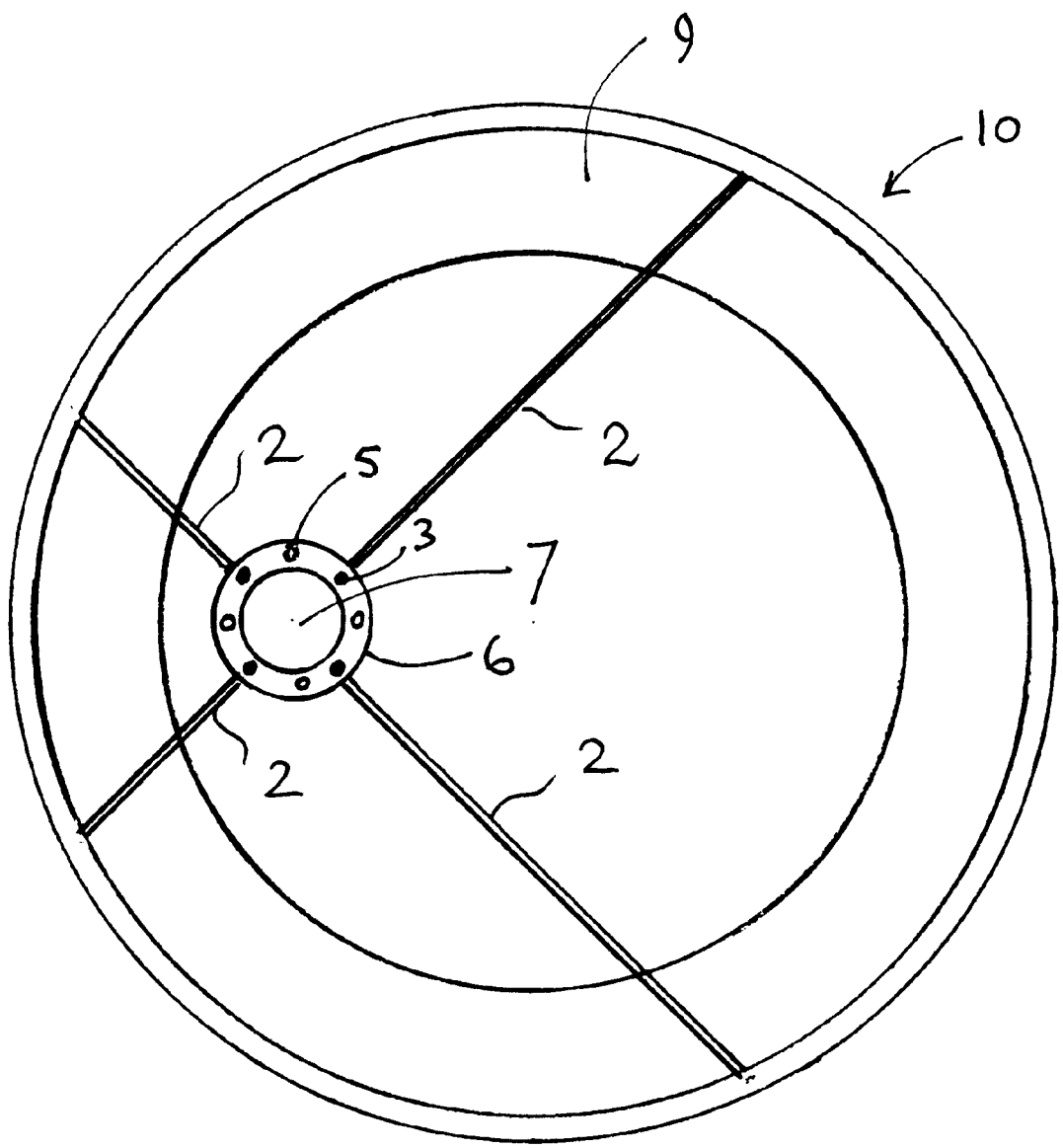
FIG. 2 is a plan view of said device.
Figure 3:
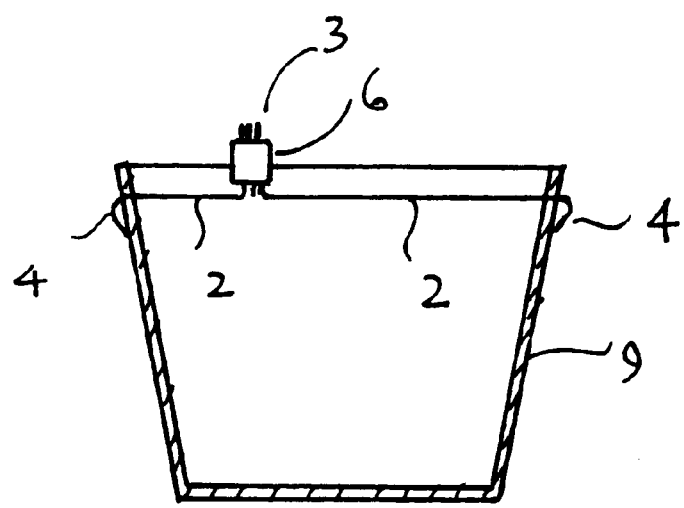
FIG. 3 is a side view of the arrangement shown in FIG. 1.

Referring to FIGS. 1 and 2, frame 1 has members consisting of a substantially horizontal element 2 an upstanding element 3 and a downward element 4. Each member is constructed from a single metal rod covered with a protective coating. Elements 3 and 4 are formed by bending the ends of the rods in opposite direction but in the same plane.

Elements 3 are inserted in bores 5 formed around the perimeter of collar 6 which defines a central vertical passage 7. In FIG. 2 the passage is shown cylindrical but it could be rectangular or have an irregular shape.

Elements 4 are inserted in holes 8 formed on the side wall 9 of container 10. A container made from a firm plastic or other material is preferable but the device can also be used if the material is resilient.

The preferred number of members is four requiring the collar to have four bores 5. However, if the collar has eight circumferentially disposed bores, four can be used to retain a plant support. The bores could have different sizes or shapes so that different sizes or types of plant supports can be used depending on the application. Obviously if the frame is constructed from rods having a circular cross-section the bores housing the upstanding elements must be cylindrical. By making one pair of elements 2 shorter than the other pair, collar 6 is positioned off centre enabling the plant to be planted in the centre of the growing medium.

Figure 4:
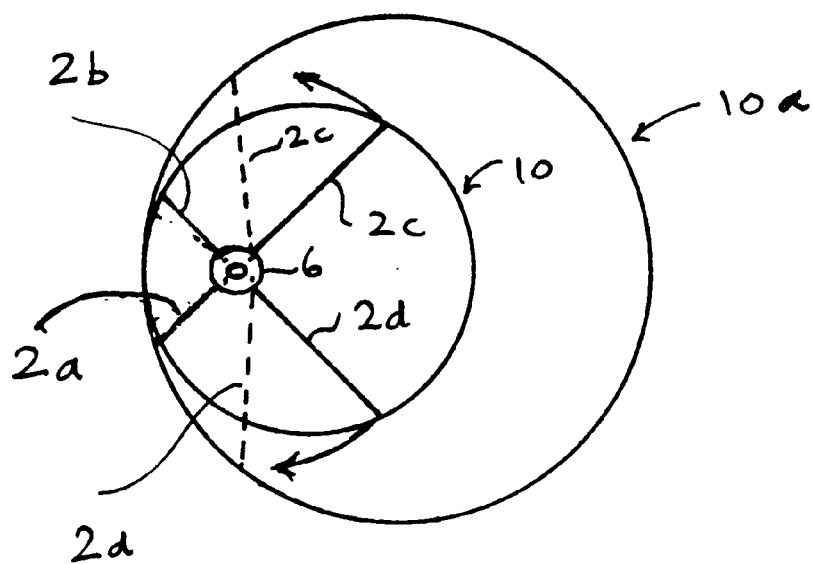
FIG. 4 is a plan view showing how one size device can be used with two sizes of a round container.

In FIGS. 1 and 2 elements 2 are shown at 90° to each other. Since elements 3 are pivoted within bores 5 the same device can be used with a larger container. Referring to FIG. 4, for a larger container 10a the shorter pair of elements 2a, 2b use holes same distance apart as for the container 10 for which elements 2a, 2b, 2c, 2d have been sized to produce a 90° angle between adjacent elements and for the collar to be off centre if desired.

To locate the required holes for elements 2c and 2d when container 10a is to be used with the same device as for container 10, the device is placed on the container rim with elements 2a, 2b resting directly above the holes already on 10a and with the downward elements bearing against the rim. 2c and 2d are then rotated in the direction of the arrow until the corresponding downward elements are in contact with the rim, the position is marked and the holes made. Since the length of elements remain the same the collar is further off centre with the container 10a than container 10. Although the angular displacement between the longer elements 2c, 2d is no longer 90° the rigidity of the assembly is maintained. As the container size is increased, the collar becomes further displaced from the centre of the container and therefore there is a limit to the increase in container size using the same size device.

It is important that with movement of the plant support the assembly of collar 6 and frame 1 is retained firmly within holes 8. To this end elements 3 are made a sliding fit into the bores and are bent at an angle of about 110°. Elements 4 are bent at an angle of about 80°. In use elements 3 are inserted into the bore and elements 4 into the appropriate holes 8. Provided elements have been sized correctly in relation to the position of the holes, when the collar is pushed downwards as far as the bend on the member, elements 3 are pulled inwardly in the radial direction towards the centre, elements 4 press tightly against the holes and/or side walls of the container and the frame is prevented from being dislodged with movement of the plant support.

In use collar 6 has to be fitted to elements 3 after elements 4 have been inserted into holes 8 and cane 11 is inserted through the central passage 7 into the container 10 and into the growing medium 12 (FIG. 8). Since a cane has an irregular shape and there is no guarantee that it will fit tightly within passage 7 the length of collar 6 is made about 40 mm to prevent the cane or stake from excessive tilting. Instead of one thick collar two thin ones can be used spaced about 30 mm apart.

Passage 7 is sized to receive an average size cane or stake. Smaller sized plant supports can be used by inserting a tube 6a within the passage with the tube resting on the growing medium (FIG. 8). If both the centre passage and the four bores receiving elements 3 need to be downsized so that a thinner rod can be used to construct the members in the case when appropriate by the size of container, the attachment shown in FIG. 5 can be used. A thin disc having a hole 13 has tubes 14 attached to it which are inserted into the bores 5 with an interference fit. The length of tubes 14 is half that of bores 5 so that a similar attachment can be inserted from the opposite face of the collar. If it is desirable to prevent the cane or stake from entering the growing medium a clip made from spring wire or strip such as the one shown in FIG. 6 can be used with parts 15 fitting into opposite bores and part 16 blocking the passage.

FIG. 7 shows a device constructed from a single size frame used with a round or square container. For an oblong container two devices may be required depending on the length of the container.

FIG. 8 shows different types of plant supports 11, 11a retained by the collar's central passage or bores.

What I claim as new is as follows:

1. A device for retaining supports for plants in a container, comprising: a frame consisting of a plurality of members with each of said member consisting of a substantially horizontal rod element, a downward or upward rod element making an angle of slightly less than 90° to the horizontal rod element; and an upstanding rod element making an angle of slightly greater than 90° to the horizontal rod element, at least one collar defining a substantially vertical passage therethrough adapted to retain a plant support, the collar having vertical bores in a wall thereof adapted to releasably receive the said upstanding rod element of said member and retain the vertical rod element of a plant support, the downward or upward element of said member being adapted to releasably engage a respective hole in a side wall of the container; the angles and the length of the horizontal rod element of said member being such that as the collar is pushed downwardly onto the upstanding rod elements the frame is pulled radially inwards and the downward or upward rod elements bear tightly against the container wall; there being further means for reducing the radial dimension of the vertical passage and the vertical bores of the collar to retain smaller sizes of plant supports and smaller sizes of upstanding rod elements respectively.

2. A device as in claim 1 wherein said member is formed from a single rod bent into shape.

3. A device as in claim 1 wherein the said horizontal elements may have different lengths.

4. A device as in claim 1 wherein the bores are cylindrical and their axes are equidistant from the center of the collar.

5. A device as in claim 4 wherein at least four of the said bores have equal diameters.

6. A device as in claim 1 wherein the upstanding rod elements are received within the bores with a friction fit.

7. A device as in claim 4 or claim 5 wherein the means for reducing the radial dimension of the central passage and the bores is provided by a disc having a central hole smaller than the central passage, cylindrical tubes attached perpendicularly to the disc and inserted with a friction fit into the bores of the collar with the disc resting on the collar.

8. A device as in claim 1 wherein the means for reducing the radial dimensions of the central passage is a tube inserted within the central passage.

9. A device as in claim 1 further comprising a container having a plurality of holes on a side wall equal to the number of said members of said frame.

10. A device as in claim 1 further comprising a spring clip attached to said collar to prevent the plant support passing through said collar.

* * * * *